US007588061B2

(12) United States Patent
Poussin

(10) Patent No.: US 7,588,061 B2
(45) Date of Patent: Sep. 15, 2009

(54) APPARATUS FOR LOADING A VESSEL, WITH SOLID PARTICLES

(76) Inventor: Bernard Poussin, 5, rue la Forme, F-78420 Carrieres sur Seine (FR)

( * ) Notice: Subject to any disclaimer, the term of this patent is extended or adjusted under 35 U.S.C. 154(b) by 437 days.

(21) Appl. No.: 10/580,437

(22) PCT Filed: Nov. 24, 2004

(86) PCT No.: PCT/FR2004/003006

§ 371 (c)(1),
(2), (4) Date: Jul. 25, 2006

(87) PCT Pub. No.: WO2005/051814

PCT Pub. Date: Jun. 9, 2005

(65) Prior Publication Data

US 2007/0181612 A1 Aug. 9, 2007

(30) Foreign Application Priority Data

Nov. 25, 2003 (FR) .................................. 03 13771

(51) Int. Cl.
B65B 1/04 (2006.01)
B65G 1/00 (2006.01)
B65G 53/40 (2006.01)

(52) U.S. Cl. ..................... 141/286; 141/70; 414/301; 406/158; 406/162

(58) Field of Classification Search ............ 141/2, 141/18, 67, 69, 70, 234, 237, 285, 286; 414/301; 406/154, 157, 158, 162, 181, 182; 222/564; 422/137, 225

See application file for complete search history.

(56) References Cited

U.S. PATENT DOCUMENTS

| 3,490,619 | A | | 1/1970 | DeWittie | |
|---|---|---|---|---|---|
| 3,854,637 | A | * | 12/1974 | Muller et al. | ............... 222/564 |
| 3,949,908 | A | | 4/1976 | Baillie | |
| 3,972,567 | A | * | 8/1976 | Uhl | ............................ 406/181 |
| 4,039,431 | A | * | 8/1977 | Baillie | ........................ 208/146 |
| 4,306,829 | A | | 12/1981 | Loutaty et al. | |
| 4,564,328 | A | * | 1/1986 | Loutaty et al. | .............. 414/301 |
| 4,919,303 | A | | 4/1990 | Boudreault | |
| 5,238,035 | A | | 8/1993 | Poussin et al. | |
| 5,906,229 | A | * | 5/1999 | Haquet et al. | ............... 141/286 |
| 5,950,694 | A | | 9/1999 | Jama et al. | |
| 6,648,932 | B1 | * | 11/2003 | Maton | ......................... 48/119 |

FOREIGN PATENT DOCUMENTS

| BE | 899420 | 7/1984 |
|---|---|---|
| DE | 40 16 648 A1 | 11/1990 |
| FR | 1 171 460 A | 1/1959 |
| FR | 2 258 795 | 8/1975 |
| FR | 2 653 092 | 4/1991 |

* cited by examiner

Primary Examiner—Timothy L Maust
(74) Attorney, Agent, or Firm—Oliff & Berridge, PLC

(57) ABSTRACT

A body (1), feeding a group of enlarged pipes (2) in which straight pipes (6) slide so as to control the discharge of particles. At the exit of these tubes, the particles are propelled towards the periphery by gas jets that originate from perforated tubes (4). A rotating set of plates (3) whose periphery is fitted with brushes (30) having bristles of various dimensions, scatters the particles in such a way so as to distribute them uniformly according to a horizontal plane. A correcting device (9, 11, 12, 13, 14 and 16) that gets its feed of particles from the top of the device enables to set right any maldistribution by directing an additional partial flow of particles towards an area where the height of the bed is low or uneven. Such a machine can also be used for the loading of silos or of catalytic reactors.

9 Claims, 4 Drawing Sheets

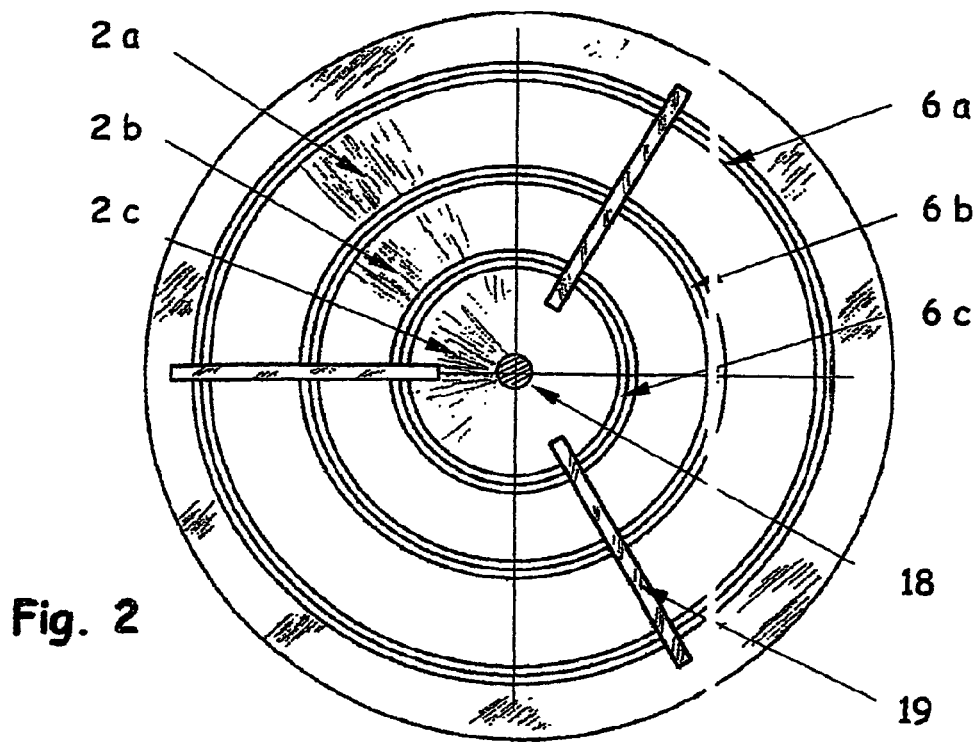
Fig. 2
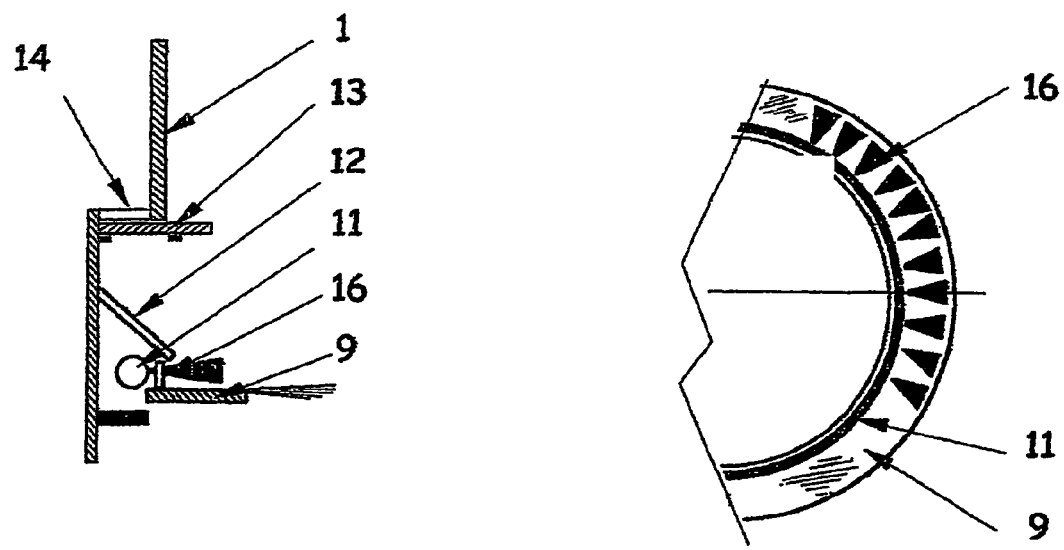
Fig. 3
Fig. 4

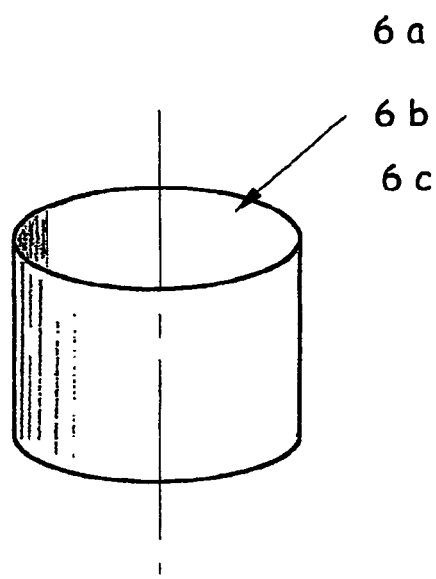
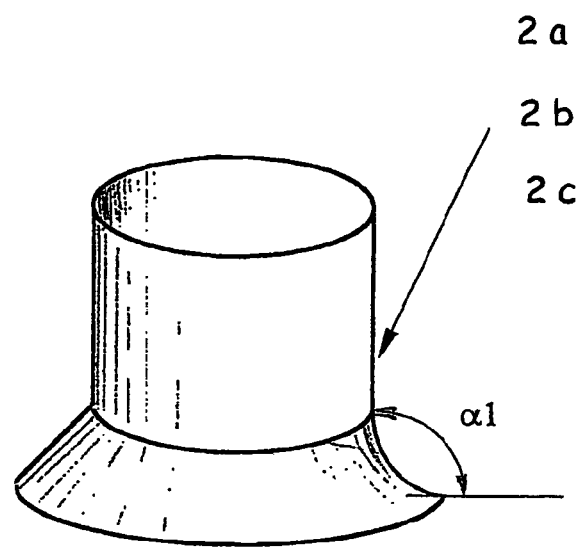
Fig. 9                Fig. 10
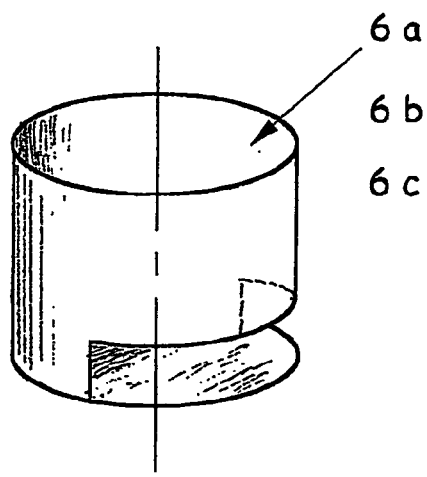
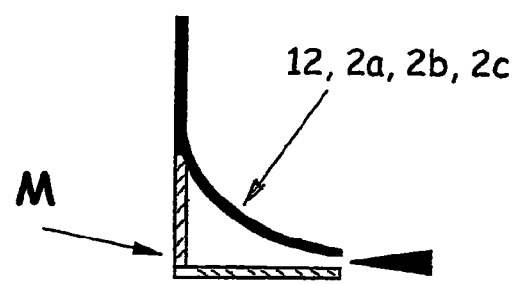
Fig. 9 bis            Fig. 8

APPARATUS FOR LOADING A VESSEL, WITH SOLID PARTICLES

The present invention relates to the field of loading vessels with solid particles such as grains or substances in granular forms. These vessels are used in the petroleum and chemical industries and as storage silos for cereals and generally for all types of storage vessels, containing solid granular particles.

These vessels like silos or reactors are generally filled with the help of hoppers or funnels. The hoppers pour the grains through flexible pipes or hoses or rigid pipes into the vessel or container.

However, this system of loading the vessels has numerous disadvantages.

First, it does not optimise the quantity of grain stored within the vessel since large gaps still remain between the grains and hence, the entire volume of the container is not completely utilised. As a result, there can be a deficit of 10 to 25% as compared to what is theoretically possible.

Secondly, a granulometric segregation takes place that results in the largest grains settling on the outside, whereas the very fine and dust like particles form a chimney stack in the central part of the vessel. This brings about heterogeneity in the bed of the vessel. This can be harmful when a fluid has to flow across the bed in order to bring about a reaction in the case of catalysts or to ensure the preservation of raw material in the case of cereal storages silos.

Finally, when the loading begins, the grain is projected with great force against the inner walls of the container, which results in a high percentage of grains being broken or damaged.

In order to avoid these shortcomings, a number of loading techniques exist. One such technique is described in the Patent BE 899420 that makes use of an immovable sleeve with open end. Another machine, which is static, is described in U.S. Pat. No. 3,949,908 with quite a number of improvements, blows gas from the sides in order to scatter the grains. However, these devices don't succeed in loading all the vacant areas of the container. This also causes attrition of the grains as well as production of dust.

There are also other devices for loading vessels and containers that make use of rotating machines. For example, those described in the patents FR2258795 or also FR 2653092 or again in U.S. Pat. No. 5,950,694. Here, the results are better in terms of grain distribution. However, even here, certain problems still remain due to friction of the grain against flexible materials that have a very high friction coefficient or due to friction between the grains themselves when they flow out through the loading hopper into movable distributor components. This grain friction brings about damage to the grain as well as dust formation that is detrimental to loading quality as well as to the quality of further operations to be carried out.

Besides, the devices described in the patents mentioned above, don't allow the control of the flow of grains.

Finally, they don't ensure the correction of accidental deviations with regard to the height of the bed that can result from localised irregular flow of grains, for instance, due to the presence of foreign bodies or due to the coalescence of certain particles.

The present invention aims to resolve the disadvantages and deficiencies mentioned above by proposing an apparatus, that brings about a more homogenous, rain-like regular distribution of the grain over the entire flat horizontal surface of the bed, this ensures the protection of particles or granules that are to be put in the container by avoiding attrition and also by reducing the quantity of dust emission, that ensures the correction of eventual anomalies that might arise during the loading process such as, for instance, the deficiency of particles in an area of the container without stopping the loading operation, that finally ensures an easy and progressive control of the rate of loading of the vessel.

As per the proposed invention the loading machine for grains and particles consists of an approximately cylindrical body, within which, first, is a collection of vertical tubes enlarged out towards the bottom in bell shaped forms. These tubes are arranged one within the other leaving between themselves as many adjustable spaces or passages so as to control the flow of the grains or particles.

At the exit of this first vertical setup from where the grain flows by gravity, there is a mechanism for particle dispersion that includes:

a propelling pneumatic device that releases, at the lower end of the bell shaped nozzle, a radial gas spray, that has an adjustable shape and duration.

a centrifugal mechanical distribution device made of plate that rotate around the system's vertical axis in order to take the grain towards releasing points uniformly distributed in the horizontal plan of the receiving vessel.

Finally a means to correct the accidental uneven distribution resulting from the presence of external bodies or from clusters of grain, makes the apparatus complete. It takes the grains at the inlet of the machine in order to selectively distribute it over a limited portion of the periphery.

FIG. 2 depicts a top sectional view of the feeding system.

FIG. 3 depicts a vertical sectional view of the grain controlling mechanism.

FIG. 4 depicts a top sectional view of the grain controlling mechanism.

FIG. 8 depicts that the gas jets may originate from a container around the lower portion of each pipe opening between the lower part of the bell shape pipes and the crown (M) of a radial profile.

FIG. 9 depicts a top sectional view of the straight pipes

Figure 1:
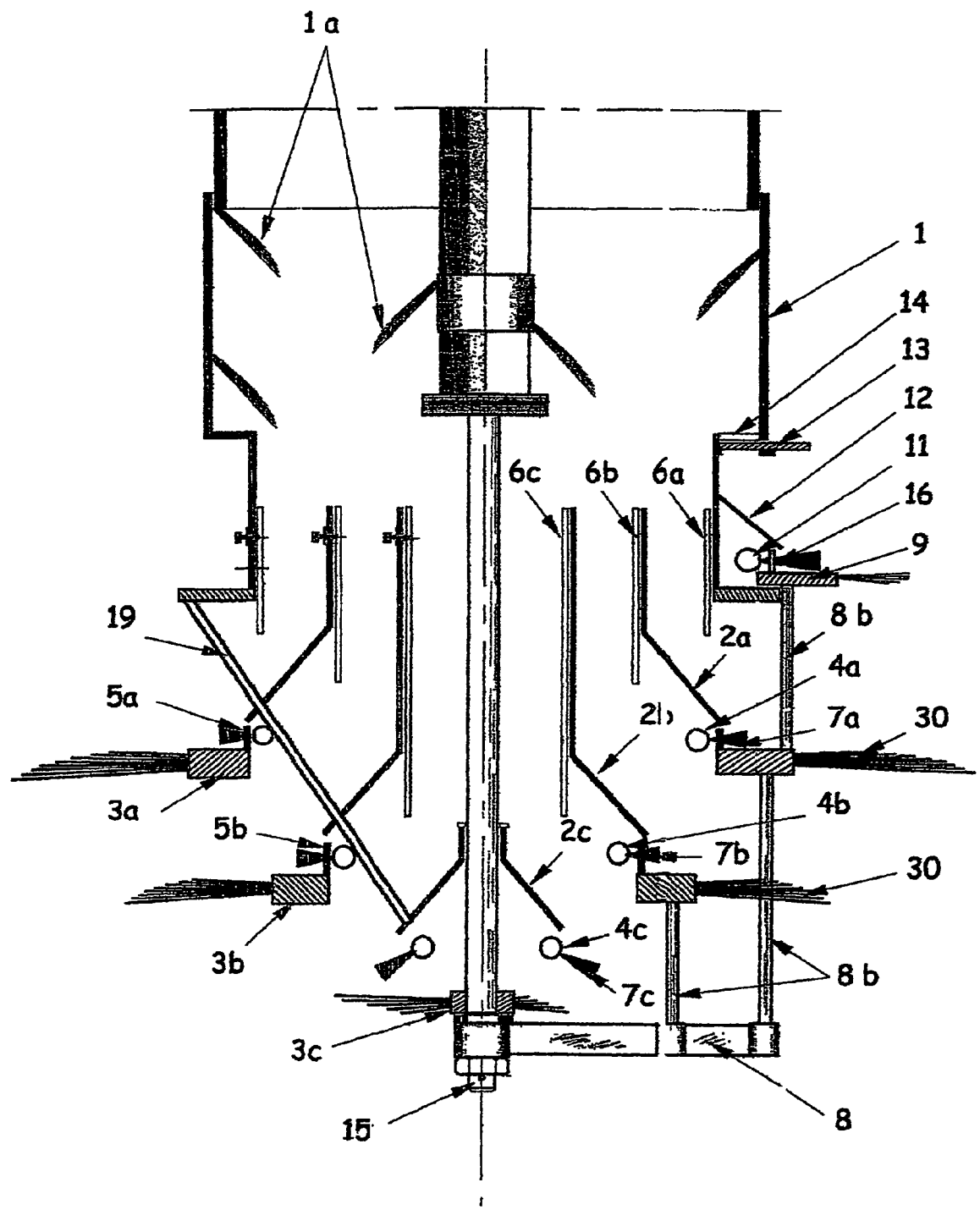
FIG. 1 depicts a vertical sectional view of how the invention's feeding system works.
Figure 5:
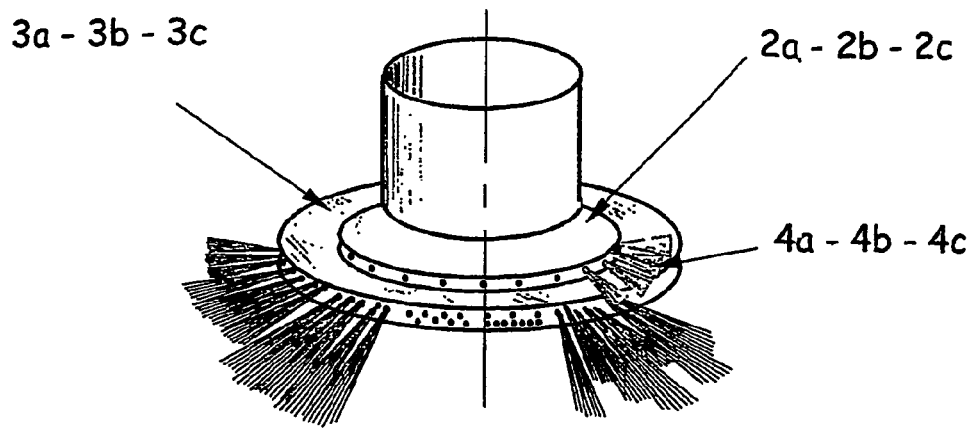
FIG. 5 depicts a perspective sectional view of the brushes on the distribution plates.

FIG. 9 bis depicts an alternate embodiment of FIG. 9.

FIG. 10 depicts the upper and lower parts of the bell shaped pipes.

The body (1) into which the grain is loaded in bulk at upper area, is fitted with brush deflectors (1a). The lower portion of the apparatus has a set of bell shaped nozzles (2a) (2b) (2c) ard straight pipes (6a) (6b) (6c) that can slide vertically independently. The lower sides of these straight tubes together with the bell shaped nozzles (2a) (2b) (2c) control the passage of the grains.

The bell shaped nozzles are linked to each other as well as to the body (1) of the apparatus by the help of rods (19).

The same rods (19) carry at the level of the bell shaped nozzles (2a) (2b) (2c), circular tubes (4a) (4b) (4c) fed by pressurized gas and perforated in order to allow the gas jets (7a) (7b) (7c) to escape towards the exterior.

The jets (7a) (7b) (7c) are covered or opened by perforated rings (5a) (5b) fixed within the inner part of the distribution plates (3a) (3b) (3c).

The perforated tubes and rings together make up the system to project the grain out.

The centrifugal mechanical device for distribution is made up of a shaft (15), set in rotation by an electrical, pneumatic or hydraulic motor. The shaft is coupled to arms (8) with rods (8b) at the end supporting the distribution plates (3a) (3b) (3c) at the lower level of the bell shaped nozzles and tubes (2a) (2b) (2c).

Each of the distribution plates (3a) (3b) (3c) is made up of a hub which is more or less horizontal crown shaped with a perforated ring (5a) (5b) and a set of brushes (30) horizontally spreading across the entire surface. The length and direction of the bristles (30) vary according to their position on the hub's periphery.

The distribution (FIG. 3 and FIG. 4) is corrected in the following manner.

An opening (14) is made in the body (1) and is sealed by a diaphragm (13) which can be adjusted depending on the position. The flow of grain can thus be controlled. These grains move smoothly down the slope (12) and are propelled by gas jets (16) coming from the perforated tube component (11) through a perforated rotating ring similar to (5a) (5b). The said perforated ring is attached to a distribution plate (9) is similar to (3a) (3b) (3c) that is driven by the rods (8b).

The distribution corrective device facilitates the localized flow of grains toward a particular area of the bed where the height may be too low due to inadvertent mal-operation.

According to the present invention, the loading apparatus functions in the following manner.

The particles flow out towards the base of the device by the force of gravity and are distributed by separate outlets through open tubes (2). The flow is controlled by raising the straight pipes (6). Each straight pipe corresponds to an open tube outlet which has a section for passage of grains, adjustable separately.

The particles flow by gravity along the bell shaped tubes (2a) (2b) (2c) and are directed towards the outside of the container to be filled through the springboard effect of the base plate of the bell shaped pipes. These pipes are bigger than the lower ones so that the grains are blown out by the gas jets (7) towards the outside of the container by the distribution plates (3) having soft bristles or brushes which are of circular shape.

In the preferred form of the feeding device of the apparatus the following elements can be used, without limiting in any way the domain of the invention.

The upper part of the bell shaped pipes are either cylindrical with the lower part ending in the shape of a circular arc or a cone; or a polygonal section with one part widening out and sloping in a straight pyramid shape. In this case the number of sides of the polygonal part will be equal and will correspond to the number of the sides of the pyramid.

The profile of the circular shape will form an angle (al) with the vertical between 15° to 120° and in the preferred form between 60° and 90° (FIG. 10). The conic and pyramidal profiles will make an angle between 15° and 85° with the vertical, and in the preferred form, an incline of 30° to 60°, with the vertical.

Another advantage of the polygonal shape is the ability to release at varying distances, with respect to the diameter, the particles of grain on the plates fitted with brushes and varying distances of projection within the enclosure. In this way, a first distribution takes place while varying the distance of the projection of the grains towards the bed.

The regular polygon will have some 4 to 16 sides, the preferred form having between 6 to 8 sides.

The propulsion group is realized by means of circular pipes (4a), (4b) and (4c). These are situated below the edges of the opening of the bell shaped pipes at the level of the plates fitted with brushes or above their upper portions, they have apertures or nozzles placed to their outside in a more or less horizontal direction with variations from 0° to a maximum of 30° toward the top and from 0° to 20° maximum towards the bottom, with the preferred variation between 0° to 15° towards the top and 0° to 10° towards the bottom.

The gas jets from the propulsion device can also originate from a well-defined container around the lower portion of each pipe opening between the above mentioned lower part and the crown (M) (FIG. 8), of an appropriate radial profile.

The apertures or nozzles from where the propulsion devices of the gas jets originate can be brought together into one continuous opening. In this case the gas jets are transformed into a continuous laminary flow along the lower side of the bell shaped nozzles.

The force of the blowing can be set in order to have identical and permanent flows. According to the principle of an aero-dispersion fixed blowing, the advantage lies in blowing the particles in a uniform manner towards the brushes. The force of the blowing can be adjust-ed by regulating the gas pressure in the circular pipe. But it is advantageous to have various thrust forces in order to create distances of projection different for particles. For example three orifices with diameters of 1.5 millimeters, 2 mm, and 3 mm made on the rim enables to project with a 2 bar pressure, particles of sizes ranging from 2 mm to 4 mm and with a density of about 0.7, to a distances of 1.2 m, 1.8 m and 2.5 m respectively.

An improved process consists of stopping the blowing over all or only part of its zones of emission or to vary its intensity.

In this improved process the effect of gas flow coming on the plate more or less horizontally, in regulated intensity; can be modulated and its intensity level; can be regulated partially or totally as per the requirements. It is in fact quite interesting to be able to permanently modulate the radial projections of the particles in the container.

The basic principle for an effective granulometric distribution in the vessel or the container is a proper sprinkling of all sections of the container where the particles are projected. In the traditional processes of projection of particles based on centrifugal force or gas projection it is recommended to periodically carry out 'sweeping operations' by changing the speed of rotation of the moving elements or by changing the pressure of gas used for projection.

In order to obtain this effect, the brushfitted plates are equipped with a vertical barrier on the inner side. This barrier is in the form of a more or less circular ring situated at the higher level of the brush plates going up to above the apertures or nozzles that create a blast that makes a partial and variable obstacle in the passage of the gas flow.

The variable effect is obtained by modulating the passage of the blast across the ring. To get this result the ring is having more or less big holes, and closer or farther to each other, one part of the ring is made up of a grid or a screen with a porosity ranging from 1% to 99%. It has been noticed that a porosity of 10% to 90% gave excellent results to vary and modulate the force of the gas jet.

The distance from the ring (5) to the gas exits will be maintained between 0.1 mm and 20 mm and the ring's (5) height that obstructs the jets (7) will be maintained between 0.5 and 5 times the diameter of the aperture generating the gas jet; or of the height of the propulsion device's opening that is formed by the crown (M); and the lower part of the opening tube. In any case, the preferred dimension will be within a range of 1 and 3 times.

The distribution plates with brushes of the apparatus (FIG. 6) are flat or have a more or less cylindrical rim with stiff, flexible and smooth bristles or branch systems equipped with bristles on their periphery.

The inner dimension of the plates is between ½ or 2 times the largest size of the bell shaped pipes; and its outer dimension is between 1 or 10 times the largest dimension of the bell shaped pipes.

The brush fitted plates are soft at upper parts to facilitate the intake as well as the distribution of the solid particles. This upper side is plain and/or hollow, with a slope which is descending or ascending from the plate centre to the outside at an angle between 0° and 20°. In the preferred version of the invention, the inclination is between 0° and 10° to the horizontal plane.

There will be 1 to 20 plates and in the preferred form of the invention from 2 to 5 plates.

The upper middle plane that receives the grains is horizontal or inclined and has a maximum angle of 10° as compared to the horizontal. In the preferred form of the invention the slope is between 0° and 2° and variable along the outline of the plates that brings about an effect of 'sweeping' that improves the grain distribution.

Figure 6:
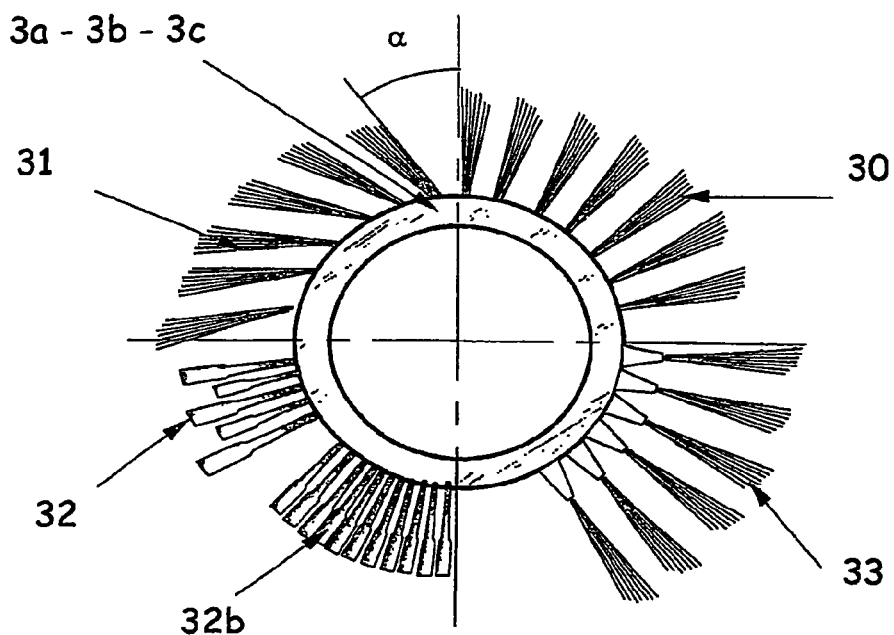
FIG. 6 depicts a top sectional view of the brushes on the distribution plates.

The brushes' bristles (30) (31) (FIG. 6) are supple, flexible, semi-hard of different shapes and sizes: rounded, cylindrical or oval or of different geometrical shapes: rectangular, square, trapezoidal, triangular or any other shape. The bristles are made of natural fibre such as tampico, metallic fibers or more wiry or synthetic that are made of Rilsan, Nylon, polyester of a diameter of $75/100$ mm to 2 mm and a length of more than 200 mm. The bristles can be tube shaped and thermo retractable with a diameter of 2 mm to 20 mm and can be adjusted to particular shapes and arrangements (32) (32b) (FIG. 6).

The bristles have more or less rectilinear or curved shapes with eventually a spiral movement along their length, preferably rectilinear or slightly curved.

The average diameter of the bristles is between $1/10$ mm and 6 mm and characterized by a distance equal to two times the average length measured between the centre of gravity and the points that form the outline of the bristles.

The preferred dimension of the present invention, is with the bristles of an average diameter between 0.1 mm and 1.5 mm.

These bristles are characterized by their suppleness and softness required to protect the grain when they come into contact with them. The scattering of the grain or solid particles will bring about a deformation of the bristles. They would have to also release the absorbed energy, by a certain elastic action. The bristles are characterized by regaining their previous form.

The length of the bristles will remain between 1 mm to 3000 mm.

For a given loading machine, the varying length of the bristle will be according to the number of distribution stages, the length of the bristles will vary so as to distribute the particles uniformly on the entire surface of the bed to be loaded.

The length of the bristles on the distribution plate will depend on the radius of the container to be filled and will be between 1% and 50% of the vessel radius, the preferred length would be between 5% and 20% of this radius.

Figure 7:
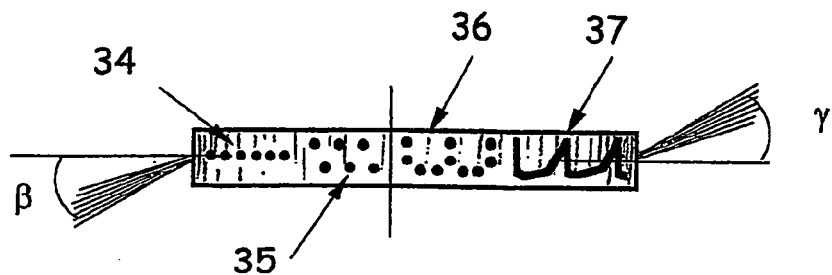
FIG. 7 depicts a side view of possible arrangement for the bristles on the distribution plates.

The position of the bristles on the distribution plate will correspond to different configurations on the width of the plates. At the same horizontal level (34) FIG. 7 or with alternating levels of location of bristles on the lower part of the plate and on the upper part, or located helically or in quincunx, (35) according to a profile sinusoidal, or in the U form (36) which is the preferred form of the present invention (FIG. 7). The bristles can be located in an angular radiant position (30) (FIG. 6) with respect to the center of the plate, or at an angle of 0° to 45° with a preferred position of 0° to 15° (31) for this invention. The bristles can be located at an angle between 0° to 30°, with respect to the horizontal plane, towards up or towards down, with a preferred position of 0° to 15° for this invention.

The bristles will be arranged as a continuous sheet or not (37) FIG. 7 on the periphery of the plate, or in tufts or on supports fixed in the brushes. For example, they will be fixed at the flattened extremity of the hollowed sticks giving them a fan-like shape (33).

The plates can also be fitted with soft strips or wrappings with articulated movable joints to serve as a substitute for the bristles. These distributor plates with thin and smooth bands will have a flat shape, or more or less a cylindrical or oval crown. This enables fixing the smooth and semi rigid strips on the periphery of the plates. The length of these strips will be between 0.1 time and 10 times the length of the plate's diameter. The central part of the plates will be smooth so as to be able to receive and distribute the solid particles at the upper surface.

The distribution corrector system is an adaptation of the distribution process of the particles earlier described through a combination of variable aero-dispersion applied to the openings made on a part of the periphery of the apparatus's body.

These openings are brought about on the lower part of the body between the bottom and the center of the body as well as on one part of the circumference that forms a sector between 5° and 300°, with a preferred design between 60° and 180°.

The dimension of these openings ranges between 0.01 times and 0.5 times the diameter of the apparatus's body, preferably between 0.05 times and 0.2 times of this diameter.

The opening's dimensions can be also adjusted taking into account the size of the particles to be distributed.

This system is made up by putting together compressed gas pipes (16) or of jets made up of apertures realized on the periphery of the crown or that area of the crown that directs the particles towards the deficient zone; and/or of a distribution plates fitted with brushes.

The vertical direction of the gas jets (7), of the propulsion device vary in accordance with their position along the gas circuit from which they get their gas feed.

The gas jets (7) of the propulsion device get their gas feed from ring like chamber formed around and within the bell shaped openings of the feeding device (M)

The invention claimed is:

1. An apparatus for loading vessels such as reactors and silos with solid particles, the apparatus comprising:

- a supplying device that includes a plurality of bell-shaped tubes having an enlarged bottom portion wherein the plurality of bell-shaped tubes are co-axially within one another,
- a propulsion device including apertures or nozzles for producing gas jets that are located below an edge of each of the plurality of bell-shaped tubes for projecting the solid particles in a radially outward direction from a first vertical axis of the apparatus; and
- a distribution device that includes a plurality of rotating plates, wherein each plate of the plurality of rotating plates rotates around a second axis of the apparatus, and wherein each of the plurality of rotating plates is disposed under a corresponding one of the plurality of the bell-shaped opening tubes to receive the solid particles projected out by the gas jets.

2. The apparatus according to claim 1, further comprising vertical pipes that slide independently of each other around a corresponding one of the plurality of bell-shaped tubes.

3. The apparatus according to claim 1, wherein the rotating plates further comprise annular perforated ring members fitted with brushes or soft and flexible bristles.

4. The apparatus according to claim 3, wherein the brushes or bristles have varying radial dimensions based upon a position on a periphery of the annular perforated ring members.

5. The apparatus according to claim 1, further comprising a gas pressurizing device that generates a gas pressure for adjusting a blowing force of the gas jets by regulating the gas pressure in a gas feeding circuit.

6. The apparatus according to claim 1, wherein the apertures or nozzles are capable of being partially sealed and modulated by annular perforated ring members fixed to the plurality of rotating plates.

7. The apparatus according to claim 5, wherein a vertical direction of the gas jets varies based upon a position of the gas jets along the gas feeding circuit.

8. The apparatus according to claim 5, wherein the gas feeding circuit is an annular hollow chamber formed around and within each of the bell-shaped tubes.

9. The apparatus according to claim 5, wherein the pressurized gas from one or more of the gas jets is brought together to form a laminar jet originating from an opening along the gas feeding circuit.

* * * * *